United States Patent
Kavak et al.

[11] Patent Number: 6,104,725
[45] Date of Patent: Aug. 15, 2000

[54] TELECOMMUNICATION SYSTEM INCLUDING A LOCAL AREA NETWORK (LAN), AN ASYNCHRONOUS TRANSMISSION MODE (ATM) NETWORK, AND A BROADBAND DATA SERVICE (BDS) NETWORK IN WHICH A PROTOCOL DATA UNIT IS NOT RECONFIGURED IN THE (BDS) NETWORK

[75] Inventors: Nail Kavak, Varby; Kim Laraqui, Stockholm; Ala Nazari, Haninge, all of Sweden

[73] Assignee: Telia AB, Farsta, Sweden

[21] Appl. No.: 08/776,598

[22] PCT Filed: Jul. 6, 1995

[86] PCT No.: PCT/SE95/00829

§ 371 Date: Apr. 1, 1997

§ 102(e) Date: Apr. 1, 1997

[87] PCT Pub. No.: WO96/06493

PCT Pub. Date: Feb. 29, 1996

[30] Foreign Application Priority Data

Aug. 18, 1994 [SE] Sweden .................................. 9402748

[51] Int. Cl.[7] .................................................. H04L 12/56
[52] U.S. Cl. .......................... 370/466; 370/392; 370/401; 709/249
[58] Field of Search .................................... 370/352, 353, 370/468, 471, 474, 395, 401, 392, 338, 466, 467; 709/250, 249

[56] References Cited

U.S. PATENT DOCUMENTS

| | | | |
|---|---|---|---|
| 5,229,994 | 7/1993 | Balzano et al. | 370/401 |
| 5,408,469 | 4/1995 | Opher et al. | 370/60.1 |
| 5,425,029 | 6/1995 | Hluchyj et al. | 370/395 |
| 5,440,547 | 8/1995 | Easki et al. | 370/395 |
| 5,490,252 | 2/1996 | Macera et al. | 709/249 |
| 5,506,847 | 4/1996 | Shobatake | 370/338 |
| 5,640,399 | 6/1997 | Rostoker et al. | 370/392 |
| 5,687,316 | 11/1997 | Graziano et al. | 709/250 |
| 5,892,763 | 4/1999 | Laraqui et al. | 370/395 |

FOREIGN PATENT DOCUMENTS

0524316 A1   1/1993   European Pat. Off. .

*Primary Examiner*—Hassan Kizou
*Assistant Examiner*—John Pezzlo
*Attorney, Agent, or Firm*—Oblon, Spivak, McClelland, Maier & Neustadt, P.C.

[57] ABSTRACT

The invention relates to a device for broadband data service transmission in telecommunication system. The invention aims at implementing bridges in public ATM network, by which public data communication services can be used by private, local networks LAN. The bridges make use of a connectionless data service function by means of broadband data service servers (BDS). The ATM network uses the protocol AAL5. According to the invention the transmission can by that be made without buffering. Preferably respective local network is connected via only one BDS server and the transmission in the BDS network is in streaming mode.

18 Claims, 2 Drawing Sheets

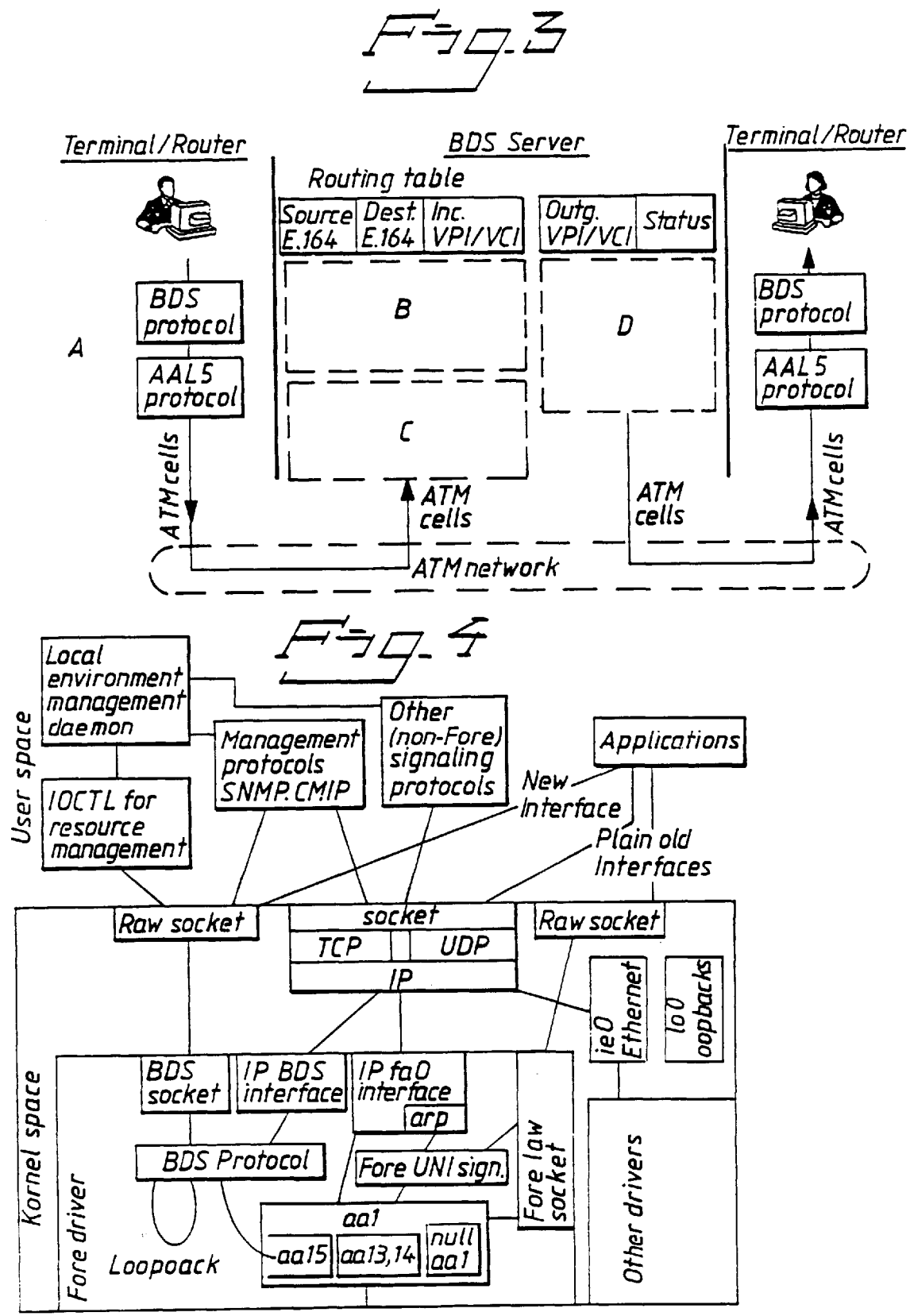

TELECOMMUNICATION SYSTEM INCLUDING A LOCAL AREA NETWORK (LAN), AN ASYNCHRONOUS TRANSMISSION MODE (ATM) NETWORK, AND A BROADBAND DATA SERVICE (BDS) NETWORK IN WHICH A PROTOCOL DATA UNIT IS NOT RECONFIGURED IN THE (BDS) NETWORK

This application is a 371 of PCT/SE95/00829 filed Jul. 7, 1995.

BACKGROUND OF THE INVENTION

1. Field of the Invention

The present invention relates to a device for broadband data service transmission in a telecommunication system. The invention is aiming at implementation of bridges in public ATM networks (Asynchronous Transmission Mode) by which public data communication services can be used by private, local area networks (LAN). The bridges use a connectionless data service function by means of broadband data service servers BDS (Broadband Data Service). The ATM-network uses the protocol AAL5 (ATM Adaption Layer 5).

2. Discussion of the Background

It is previously known to connect a local network to an ATM network by means of converting units outside the ATM network. Packing and depacking of the information occurs in each node. This requires that the server has a buffer and can maintain many connections at the same time, which causes delays in the system. A number of patent documents are also known within the field.

WO 92/2189 shows an interface for connection of local networks to ISDN (Integrated Services Digital Network). The interface is transparent for a local network user. In order to optimize the use of bandwidth, the packets are packed together to a train of packets which is compressed before it is transmitted.

U.S. Pat. No. 5.229.994 describes a bridge for connection of a local network to an asynchronous telecommunication network. The bridge allows "layer 2.1" for communication with the network.

WO 93/26107 relates to an "ATM-ETHERNET portal/concentrator" which allows transparent connection of Ethernet segment over an ATM network. By using a double port memory the construction becomes simple, the processor power slight and the capacity high, because there is no need to copy data cells.

U.S. Pat. No. 5.179.555 shows a bridge for connecting data traffic between local networks and a WAN (Wide Area Network). Data which are to be transmitted in the WAN is compressed in frames to get high transmission capacity. After each compressed frame, a marker is placed called "end of compression".

EP, A1 0 473 066 relates to a system for connection of local networks to an ATM network. In order to increase the transmission rate for cells from one bridge to another, complete logical connections are, as far as possible, used.

The above documents shows different ways of using bridges for connection of traffic between different networks, for instance local networks and an ATM network. The bridges in the shown documents use different ways in order to, in an efficient way, transfer data packets. None of the documents describe bridges which do not buffer traffic and which makes use of AAL5.

SUMMARY OF THE INVENTION

According to the invention the traffic is transmitted all the way by cells in order to avoid packing and unpacking at each node. This leads to better performance, simpler nodes, and escaping the need to buffer traffic. Consequently, the need for a large memory capacity is avoided.

Accordingly, the present invention provides a device for broadband data service transmission in a telecommunication system, comprising local networks connected to ATM network via a broadband data service network. According to the invention, the transmission does not need buffering.

Preferably the transmission occurs in the BDS network in Streaming Mode and a connectionless service function is established by means of BDS servers.

BRIEF DESCRIPTION OF THE DRAWINGS

The invention will now be described in detail with reference to the enclosed drawings, in which:

FIG. 3 shows the routing in the BDS server, and

FIG. 4 presents an example of software modules for BDS according to the invention.

DETAILED DESCRIPTION OF A PREFERRED EMBODIMENT

Figure 1:
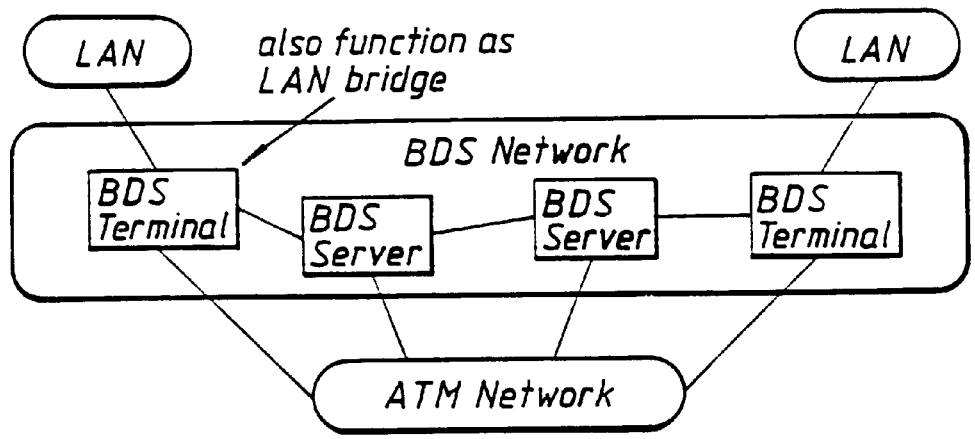
FIG. 1 shows a diagram over the network structure according to the invention.

The present invention relates to a device for implementing bridges in public ATM networks (Asynchronous Transmission Mode) by which public data communication services can be added to the system in a transmission efficient way. It is often desirable to be able to transmit tele- and data traffic from, for instance, one local network to another local network via a telecommunication system. One of the most important applications concerning broadband ISDN will be local network connections over the ATM network. FIG. 1 shows the structure of the different networks and connections.

The BDS network can be of two different configuration types: the indirect method and the direct method. The indirect method requires that the BDS network is installed outside the ATM network. It can be regarded as a network with leased lines where a more or less fixed bandwidth is allocated to the logical channel between between local network routers or servers in question.

The present invention, however, intends to use the direct method. The direct method implements a connectionless service function by means of two BDS servers. These work within the ATM network and are connected either permanently or semi-permanently. Each server performs routing by deciding the next jump to which a cell must be transmitted in order to reach its final destination, such as a router or broadband terminal. With the direct method, local networks only require one single ATM connection to a BDS server. If the connections are permanent or semi-permanent between the BDS servers, the total number of connections required in the BDS network by the end users is essentially reduced.

Figure 2:
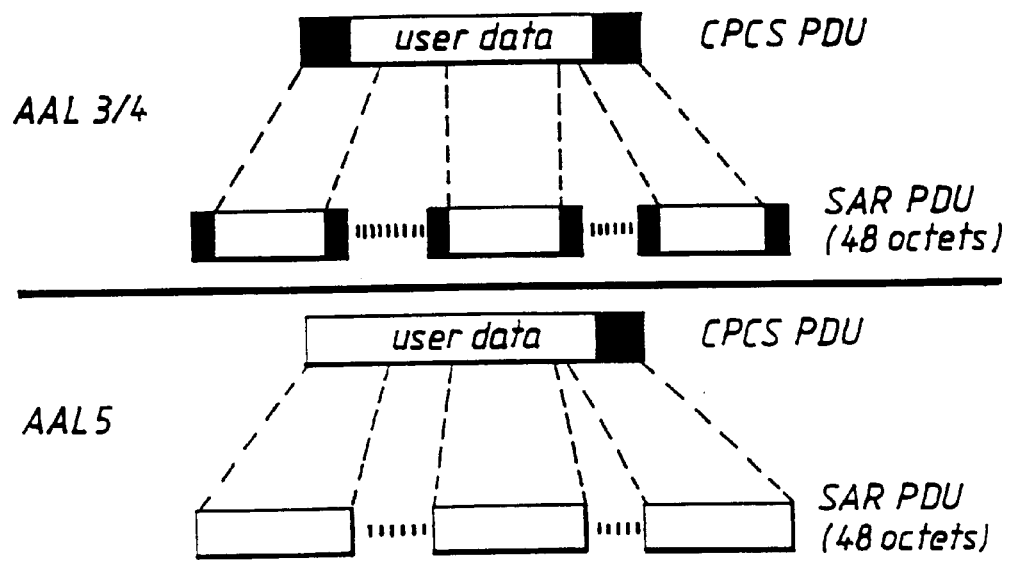
FIG. 2 presents the protocol AAL374 compared with AAL5.

In the ATM network, two adaption layer protocols are relevant: The protocol AAL3/4 and AAL5. The difference between the two protocols is shown in FIG. 2.; AAL3/4 and AAL5 differ regarding packing, unpacking and repacking of the user data to/from ATM cell pay load (or Segmentation and Reassembly Protocol Data Units, SAR PDU) and multiplexing. In the figure, payloads are white, whereas headers and end parts are broken lines.

In AAL3/4, the CPCS protocol data unit (Common Part Convergence Sublayer) receives user data and adds its own header and end part to this. In Message Mode, the whole user block is received before anything is forwarded to the ATM layer. In Streaming Mode, the user data block can be treated in pieces. After a procedure where the CPCS protocol data unit is segmented in pieces of 44 octets, these octets are combined with a header of two octets and an end part of two octets for finishing the AAL3/4 SAR protocol data unit. Notice that the header of the SAR protocol data unit contains a MID-field (Multiplexing ID), which allows the transmitter and the receiver to multiplex different user data sources and sinks over the same ATM connection; and that the SAR protocol data unit end part contains a 10-bits checking sum code. This checking sum is calculated over the whole SAR protocol data unit.

AAL5, on the contrary, only adds an end part to the user data. The end part contains among other things a checking sum field, which is calculated over the whole CPCS protocol data unit (CRC32). The division of this protocol data unit into ATM cell payloads (AAL5 SAR PDU) is, however, more straightforward than for AAL3/4, because the payload of the whole cell is used for the CPCS protocol data unit. No further check sum is supplied in the ATM-cell beside the one which is associated to the header of the ATM-cell.

Using AAL5 instead of AAL3/4 as the protocol on which the performance of the BDS network is based leads to several advantages:

The MID-field att AAL3/4 SAR protocol data unit is no longer regarded as necessary due to the large number of logical channels VPI/VCI (Virtual Path identity/Virtual Channel Identity), which can be used as the MID. Without the MID-field, one gains a payload of 10 bits per cell.

AAL5 seems to be the most chosen alternative at manufacturers of ATM equipment and many operators.

If it is supposed that the service quality of the ATM networks is very high, the use of AAL5 saves a lot of bandwidth and proccessing costs for BDS.

AAL5 is simple and easy to work with without too many changes of PDU headers and end parts.

One disadvantage with AAL5 is that CRC occurs at the end part of CPCS protocol data unit, as is shown in FIG. 2. If a BDS server in the broadband network wants to check the validity of the BDS-data which has been transferred by AAL5 units, it must reconfigure the whole CPCS protocol data unit in the BDS network. The advantage with AAL3/4 was that the SAR protocol data units themselves contained check sum fields for the whole SAR protocol data unit. This meant that a BDS server in the network could check individual cells regarding errors and at detection of problems reject all following cells belonging to the CPCS protocol data unit.

In the present invention, the AAL5 CPCS protocol data unit is not at all reconfigured in the overlaying BDS network. Accordingly, in Streaming Mode, time and memory demanding processing of AAL5 CPCS protocol data units in the servers are avoided. This means that everything in the BDS network is in Streaming Mode even if the BDS users are working in Message Mode. The underlaying assumption is that the service quality which is supplied by the ATM networks is sufficiently good for leaving most control functions to higher layers in the end systems. This solution should be balanced by an intelligent check of system parameters such as the maximum length of BDS data units, size of buffers, and load distribution technologies.

As a requirement for the cells being able to reach the BDS server it is assumed that BDS ATM-cells which are coming in on the network are tagged with VPI (Virtual Path Identity)="BDS". The ATM-backbone (Switches) must be so designed that cells with VPI="BDS" are forwarded to the BDS server.

In FIG. 3 can be seen three different BDS ATM cell types which are to be analysed by the BDS server. The BOM-cell (Beginning of Message) indicates that the cell is the first in a sequence of cells from a BDS packet. This cell is the only one in the BDS server which gets its payload analysed. The analysis aims at identifying a VPI/VCI over which the cell is to be routed and is made by translating the E.164-address on such a VPI/VCI-pair. Consequently, the invention requires that the E.164-address is available in the payload of the first cell. The rest of the cells are either COM (Continuation of Messsage) or EOM (End of Message).

Cell types are distinguished based on the bit PT (Payload Type) or AUU (ATM-User-to-User) of the header of the ATM-cell. PT=0 indicates BOM or COM, whereas PT=1 is for EOM. In order to distinguish between BOM and COM the server must rely on correct reception of EOM. If an EOM is lost, the server can wrongly take a BOM for a COM.

The implementation of the BDS-code has been performed on top of Fores host interface, code version 2.1.1. Our intention has been to use as much as possible of the existing Fores-code. Consequently, we have used its segmentation and reconfiguration routines and data structures with small modifications for dealing with support of logical channels. Such support is necessary since we tag BDS-cells with VPI="BDS", as have previously been mentioned.

Other modifications include the reconfiguration code for supporting the function of the BDS-server. The primary contribution has been to supply a thin protocol layer on top of the AAL5-code supplied by Fore, as well as a Raw contact interface and an IP-interface (Internet Protocol), which allows access to the protocol. The Raw contact interface is mainly intended for tests and network managing activities.

The terminal code consists essentially of an output routine and an input routine which each constructs and analyses the header of a BDS protcol data unit. The function of the output code is to add a BDS protocol data unit header to to the protocol of the upper layer. The header contains among other things source and destination addresses in E.164-format, and an identifier for protocols of the upper layers. The intention is to create a new bsd core memory buffer with this information and then add the user data memory buffer of the upper layer.

The output routine then calls the lower AAL5 protocol. Since this lower protocol requires a VPI- and VCI-pair for transmission, a table search must be performed which brings back the VPI/VCI-pair which corresponds to a given E.164 destination address.

On the input side, the lower protocol delivers a memory buffer chain with a BDS protocol data unit header. The header is analysed by the input routine and is then transmitted to the suitable upper protocol depending on the protocol identification field in the header. In the present embodiment we have chosen to drive this code on the breaking level of the hardware, since only a marginal number of instructions must be added to the code of the original hardware at the breaking level for performing the required analysis of the header. The two upper protocols which are available are the IP and Raw contact interfaces.

Since the BDS-server works on cell basis, the code must be introduced at the lowest level in the Fore drive unit. When a cell header has been read from the input fifo-queue, the code checks if the logical channel 10 identity is one which has been appointed to be a part of the BDS network. If yes, a table search shall be performed to find the suitable outgoing VCI/VPI-pair Posts in the table are maintained on a session level (by the use of time releasing) rather than on a packet level with regard to the efficeincy.

If the cell is a part of the middle of a BDS packet (i.e., COM) this implies stepping of a table. More complicated procedures are required if the cell is the first or the last part of a BDS packet. At that, some table modifications must be performed based on other arguments in the search function (a pointer to the cell contents as well as a flag which indicates if the cell header has an appointed message end bit (EOM)). See also FIG. 3.

The original Fore reconstruction data structure did not support VPI and only consists of a vector of VCI-posts. Each post registers what type of adaption layer the VCI is driving and which upper protocol it should be sent to. In the case with AAL5, the incoming cells are reconfigured at arrival until a whole AAL5-message has been delivered. At this point of time the whole AAL5-packet is sent to the next protocol layer.

In order to support the logical channel identifier VPI we have modified the reconfiguration data structure to a matrix, where each post is indexed by a VCI/VPI-pair. All VCI which are a part of BDS VPI are marked as BDS posts. End-BDS-cells will by that be identified and collected in their respective posts. When a whole AAL5-packet has been reconfigured again in a BDS-post, the packet is sent to the BDS input function.

A Raw contact interface was chosen to give direct access to the BDS protocol in the present embodiment. The main reason for using the Raw contact interface was that many code and data structures are obtained into the bargain, especially protocol control block managing routines (PCB Protocol Block) and data structures. The Raw contact interface works with the generic contact address structure for describing source and destination addresses. Since the system works with a completely new address family based on E.164-addresses (ISDN-numbers), a new contact address was created which might be formed on the generic contact address structure. A protocol switch for this address family was also added.

The only protocol which is available in this protocol switch is the BDS protocol. The contact flags have been defined so the messages are sent separately and the protocol represents the source address with each message. All protocol control block managing is performed with already existing Unix bsd-code and the generic routine can be used without modifications.

The output routine quite simply forms the generic source and destination contact addresses which are stored in the Raw protocol control block of contact-address-BDS-structures and then calls a BDS output function with suitable arguments.

On the input side, the BDS function assumes that all protocol identifiers in the BDS protocol data unit header which are not IP are intended for the Raw contact interface. Packets arranged for this interface consequently get their headers removed and the generic Raw input routine is called which fit source and destination addresses with corresponding protocol control blocks and contact identifiers.

In FIG. 4 is shown a sketch over software modules for the BDS implementation. To introduce a new Internet-protocol interface (IP) implies adding attach routines for drive units to this interface. Because the Fore drive unit supports IP directly over the adaption layer, a second IP interface must be created for IP over BDS. In practice an interface network structure is defined and attached by use of an interface attachment routine. The interface network structures define interface by specifying name, address, interface characterisics, routines and statistics of the interfaces. This interface network structure is very like the one which is defined for IP direct over the adaption level and the differences are that another IP-address as well as a new output routine are used.

The output routine must make a table search for converting the destination IP-address to a corresponding E.164-address. This table corresponds to the ARP tables search which must be done for IP over Ethernet. It will then call the BDS output routine with protocol identifier argument set to IP.

On the input side, the BDS input function recognizes IP-packets by the protocol identifier field of the protocol data unit being set to IP. These packets are then put in the IP input queue and a software break is posted.

The present embodiment is based on the assumption that the underlying ATM network supplies a sufficiently good service quality, so the server can assume that ATM-cells which are produced from BDS terminals are essentially free from errors.

The main advantage with an overlaying BDS network is how easy it is to introduce direct BDS services in ATM. This, however, implies that a port (in/out) to the switch to which the server is connected must be reserved for this marginal service. A physically overlaying network also causes a duplication of the BDS traffic volume from the ATM switches point of view. Ideally the BDS server should be implemented in the switch itself; in fact the BDS-server is a Streaming Mode in the switch with exception for the first cell in which it must regard the payload. A really overlaying BDS network would furthermore probably never work completely in Streaming Mode, because the BDS server and the terminals would find it too expensive expressed in processing costs to enforce breaks on cell basis.

Accordingly a device has been described which solves the, by way of introduction, mentioned problems.

What is claimed is:

1. A telecommunication system comprising:
    a Local Area Network (LAN);
    an Asynchronous Transmission Mode (ATM) network; and
    a Broadband Data Service (BDS) network connecting the LAN and the ATM network and including at least one BDS server configured to perform a connectionless service function to transmit cells between the LAN and the ATM network without reconfiguring a protocol data unit of a cell in the BDS network,
    wherein transmission of information in the BDS network is in streaming mode while BDS users work in a message mode.

2. The system according to claim 1, wherein the at least one BDS server includes a plurality of BDS servers and each of the plurality of BDS servers decides a next node in which a cell must be transmitted to reach its final destination.

3. The system according to claim 1, wherein the ATM network includes at least one switch which forwards BDS ATM-cells having a Virtual Path Identity (VPI) field of "BDS" to the at least one BDS server.

4. The system according to claim 1, wherein the ATM network is configured to use an ATM Adaption Layer (AAL5) protocol.

5. The system according to claim 1, wherein the at least one BDS server analyzes a BDS ATM cell transmitted from the ATM network, and determines if the BDS ATM cell is one of 1) a Beginning Of Message (BOM) cell, 2) a Continuation Of Message (COM) cell, or 3) a End Of Message (EOM) cell.

6. The method according to claim 5, wherein the at least one BDS server identifies a VPI/VCI over which the BDS ATM cell is to be transmitted when the at least one BDS server determines the BDS ATM cell is a BOM cell, and transmits the BDS ATM cell to its final destination over the identified VPI/VCI.

7. A telecommunication method, comprising the steps of:

connecting a Local Area Network (LAN) to an Asynchronous Transmission Mode (ATM) network via a Broadband Data Service (BDS) network including at least one BDS server; and transmitting cells between the LAN and the ATM network without reconfiguring a protocol data unit of a cell in the BDS network, wherein transmission of information in the BDS network is in streaming mode while BDS users work in a message mode.

8. The method according to claim 7, further comprising the step of:

deciding, by the at least one BDS server, a next node in which a cell must be transmitted to reach its final destination.

9. The method according to claim 7, further comprising the step of:

forwarding, by the ATM network, BDS ATM-cells having a Virtual Path Identity (VPI) field of "BDS" to the at least one BDS server.

10. The method according to claim 7, further comprising the step of:

configuring the ATM network to use an ATM Adaption Layer (AAL5) protocol.

11. The method according to claim 7, further comprising the steps of:

analyzing, by the at least one BDS server, a BDS ATM cell transmitted from the ATM network; and determining, by the at least one BDS server, if the BDS ATM cell is one of 1) a Beginning Of Message (BOM) cell, 2) a Continuation Of Message (COM) cell, or 3) a End Of Message (EOM) cell.

12. The method according to claim 11, further comprising the steps of:

identifying, by the at least one BDS server, a VPI/VCI over which the BDS ATM cell is to be transmitted when the determining step determines the BDS ATM cell is a BOM cell; and transmitting, by the at least one BDS server, the BDS ATM cell over the VPI/VCI identified in the identifying step.

13. A telecommunication system, comprising:

means for connecting a Local Area Network (LAN) to an Asynchronous Transmission Mode (ATM) network via a Broadband Data Service (BDS) network including at least one BDS server; and means for transmitting cells between the LAN and the ATM network without reconfiguring a protocol data unit of a cell in the BDS network, wherein transmission of information in the BDS network is in streaming mode while BDS users work in a message mode.

14. The system according to claim 13, further comprising:

means for deciding, by the at least one BDS server, a next node in which a cell must be transmitted to reach its final destination.

15. The system according to claim 13, further comprising:

means for forwarding, by the ATM network, BDS ATM-cells having a Virtual Path Identity (VPI) field of "BDS" to the at least one BDS server.

16. The system according to claim 13, further comprising:

means for configuring the ATM network to use an ATM Adaption Layer (AAL5) protocol.

17. The system according to claim 13, further comprising the steps of:

means for analyzing, by the at least one BDS server, a BDS ATM cell transmitted from the ATM network; and means for determining, by the at least one BDS server, if the analyzed BDS ATM cell is one of 1) a Beginning Of Message (BOM) cell, 2) a Continuation Of Message (COM) cell, or 3) a End Of Message (EOM) cell.

18. The system according to claim 17, further comprising the steps of:

means for identifying, by the at least one BDS server, a VPI/VCI over which the BDS ATM cell is to be transmitted when the determining means determines the BDS ATM cell is a BOM cell; and means for transmitting, by the at least one BDS server, the BDS ATM cell over the VPI/VCI identified by the identifying means.

* * * * *